United States Patent [19]

Cass et al.

[11] Patent Number: 5,325,444
[45] Date of Patent: Jun. 28, 1994

[54] METHOD AND APPARATUS FOR DETERMINING THE FREQUENCY OF WORDS IN A DOCUMENT WITHOUT DOCUMENT IMAGE DECODING

[75] Inventors: Todd A. Cass, Cambridge, Mass.; Per-Kristian Halvorsen, Los Altos, Calif.; Daniel P. Huttenlocher, Ithaca, N.Y.; Ronald M. Kaplan, Palo Alto; M. Margaret Withgott, Los Altos, both of Calif.

[73] Assignee: Xerox Corporation, Stamford, Conn.

[21] Appl. No.: 144,620

[22] Filed: Oct. 29, 1993

Related U.S. Application Data

[63] Continuation of Ser. No. 795,173, Nov. 19, 1991, abandoned.

[51] Int. Cl.$^5$ ............................................. G06K 9/36
[52] U.S. Cl. ......................................... 382/9; 382/36; 382/40
[58] Field of Search ................... 382/9, 18, 36, 40, 55, 382/25

[56] References Cited

U.S. PATENT DOCUMENTS

| | | | |
|---|---|---|---|
| 4,594,732 | 6/1986 | Tsuji ........................................ | 382/9 |
| 4,610,025 | 9/1986 | Blum et al. ............................... | 382/9 |
| 4,791,675 | 12/1988 | Deering et al. ......................... | 382/18 |
| 4,847,912 | 7/1989 | Tanaka et al. ........................... | 382/9 |
| 4,979,227 | 12/1990 | Mittelbach et al. ................... | 382/40 |
| 5,050,218 | 9/1991 | Ikeda et al. ............................. | 382/1 |
| 5,054,091 | 10/1991 | Tanaka et al. ........................... | 382/9 |
| 5,065,437 | 11/1991 | Bloomberg .............................. | 382/9 |
| 5,077,668 | 12/1991 | Doi ...................................... | 364/419 |

FOREIGN PATENT DOCUMENTS

| | | |
|---|---|---|
| 0364179 | 4/1990 | European Pat. Off. . |
| 0364180 | 4/1990 | European Pat. Off. . |
| 402064 | 12/1990 | European Pat. Off. . |
| 60-7582 | 1/1985 | Japan ..................................... 382/18 |

OTHER PUBLICATIONS

Ehrich et al., "Experiments in the Contextual Recognition of Cursive Script", *IEEE Transactions on Computers*, vol. c-24, No. 2, Feb. 1975, pp. 182–194.

Serra, *Image Analysis and Mathematical Morphology*, Academic Press, San Diego, 1982, pp. 34–59.

Dan S. Bloomberg; "Multiresolution Morphological Approach to Document Image Analysis"; First International Conference on Document Analysis and Recognition, Sep. 30–Oct. 2, 1991; pp. 963–967.

John M. Carroll and Robert Roeloffs; "Computer Selection of Keywords Using Word-Frequency Analysis"; American Documentation, vol. 20, No. 3, Jul. 1969, pp. 227–233.

R. G. Casey, S. K. Chai, K. Y. Wong; "Unsupervised Construction of Decision Networks for Pattern Classification"; Seventh International Conference on Pattern Recognition, Montreal, Canada, Jul. 30–Aug. 2, 1984; Proceedings vol. 2, pp. 1256–1258.

"Stochastic Modeling for Automatic Speech Understanding" by Baker, published by Morgan, Kaufmann Publishing Inc., Palo Alto, Calif. 1990, pp. 297–307.

"Introduction to Modern Information Retrieval" by Salton and McGill, Chapter 2, pp. 24–51, published by McGraw-Hill, Inc., 1983.

"A Business Intelligence System" by H. P. Luhn, IBM Journal, Oct. 1958, pp. 314–318.

*Primary Examiner*—David K. Moore
*Assistant Examiner*—Andrew W. Johns
*Attorney, Agent, or Firm*—Oliff & Berridge

[57] ABSTRACT

A method and apparatus for determining word frequency from a document without first converting the document to character codes. The method includes morphological image processing to determine word unit characteristics for placement into equivalence classes utilizing non-content based information. Word shape representations are preferably determined and compared to define equivalent word units.

20 Claims, 2 Drawing Sheets

METHOD AND APPARATUS FOR DETERMINING THE FREQUENCY OF WORDS IN A DOCUMENT WITHOUT DOCUMENT IMAGE DECODING

This is a Continuation of application No. 07/795,173 filed Nov. 19, 1991, now abandoned.

CROSS-REFERENCES TO RELATED APPLICATIONS

The following concurrently filed and related U.S. patent applications are hereby cross referenced and incorporated by reference in their entirety.

"Method for Determining Boundaries of Words in Text" to Huttenlocher et al., U.S. patent application No. 07/794,392.

"Detecting Function Words Without Converting A Scanned Document to Character Codes" to Bloomberg et al., U.S. patent application No. 07/794,190.

"A Method of Deriving Wordshapes for Subsequent Comparison" to Huttenlocher et al., U.S. patent application No. 07/794,391.

"Optical Word Recognition By Examination of Word Shape" to Huttenlocher et al., U.S. patent application No. 07/796,119.

"Method for Comparing Word Shapes" to Huttenlocher et al., U.S. patent application No. 07/795,169.

BACKGROUND OF THE INVENTION

1. Field of the Invention

The invention relates to improvements in methods and apparatuses for document image processing, and more particularly to improvements for recognizing and determining the frequency of words or images in a document without first decoding the words or images or referring to an external lexical reference.

2. Background

In computer based electronic document processing, an attribute of the document(s) being processed which the operator often desires to know is the frequency with which some or all of the words occur. For example, Salton & McGill, *Introduction to Modern Information Retrieval*, Chapter 2, pp. 30, 36, McGraw-Hill, Inc., 1983, indicates that in information retrieval contexts, the frequency of use of a given term may correlate with the importance of that term relative to the information content of the document. Word frequency information can thus be useful for automatic document summarization and/or annotation. Word frequency information can also be used in locating, indexing, filing, sorting, or retrieving documents.

Another use for knowledge of word frequency is in text editing. For example, one text processing device has been proposed for preventing the frequent use of the same words in a text by categorizing and displaying frequently occurring words of the document. A list of selected words and the number of occurrences of each word is formulated for a given text location in a portion of the text, and the designated word and its location is displayed on a CRT.

Heretofore, though, such word frequency determinations have been performed on electronic texts in which the contents have been converted to a machine readable form, such as by decoding using some form of optical character recognition (OCR) in which bit mapped word unit images, or in some cases a number of characters within the word unit images, are deciphered and converted to coded representations of the images based on reference to an external character library. The decoded words or character strings are then compared with dictionary terms in an associated lexicon. Disadvantages of such optical character recognition techniques are that the intermediate optical character recognition step introduces a greater possibility of computational error and requires substantial time for processing, slowing the overall word unit identification process.

3. References

European Patent Application No. 0-402-064 to Sakai et al. describes a text processing device in a computer system for counting the occurrence of words in a text and displaying a list of repetitive words on a CRT. The list includes the selected words together with their number of occurrences and their locations in the text. In a case where word repetition is undesirable, an operator may substitute synonyms or otherwise alter the text by using search, display, and editing actions.

European Patent Application No. 0-364-179 to Hawley describes a method and apparatus for extracting key words from text stored in a machine-readable format. The frequency of occurrence of each word in a file, as compared to the frequency of occurrence of other words in the file, is calculated. If the calculated frequency exceeds by a predetermined threshold the frequency of occurrence of that same word in a reference domain appropriate to the file, then the word is selected as a key word for that file.

European Patent Application No. 0-364-180 to Hawley describes a method and apparatus for automatically indexing and retrieving files in a large computer file system. Key words are automatically extracted from files to be indexed and used as the entries in an index file. Each file having one of the index entries as a key word is associated in the index with that key word. If a file is to be retrieved, and its content, but not its name or location, is known, its key words are entered and its identifying information will be displayed (along with that of other files having that key word), facilitating its retrieval.

SUMMARY OF THE INVENTION

Accordingly, it is an object of the invention to provide a method and apparatus for determining the frequency of occurrence of words in a document based solely on the visual characteristics of the scanned document, and without reliance on an external lexical reference.

It is another object of the invention to provide a method and apparatus of the type described without any requirement that the words themselves be determined or decoded.

It is yet another object of the invention to provide a method and apparatus of the type described without first converting the document to optical character or ASCII codes.

It is yet another object of the invention to provide a method and apparatus of the type described that can be used to assist in key word recognition.

In accordance with one aspect of the invention, a method and apparatus are provided for determining word frequency in a document without first decoding the words in the document, or converting the document to optical character codes. The invention utilizes non-content image unit recognition, based on morphological image properties of the image unit, such as length, height, or other characteristics. Also, the invention is not limited to systems utilizing document scanning.

Rather, other systems such as bitmap workstations (i.e., a workstation with a bitmap display) or a system using both bitmapping and scanning would work equally well for the implementation of the methods and apparatus described herein.

In accordance with an embodiment of the method of the invention, the document is first input and segmented into image units. At least one significant morphological image characteristic of the image units is determined, and equivalence classes of the image units are identified into which image units having similar morphological image characteristics are clustered. The number of image units in an equivalence class determines the frequency of occurrence of the image unit.

The image units may be word units in a textual document, and a word unit is preferably evaluated by deriving a word shape representation of the word unit, which is either at least one, one-dimensional signal characterizing the shape of the word unit; or an image function defining a boundary enclosing the word unit, which image function has been augmented so that an edge function representing edges of the character string detected within the boundary is defined over its entire domain by a single independent variable within the closed boundary, without individually detecting and/or identifying the character or characters making up the word unit.

More particularly, a method and apparatus are provided for determining the frequency of words in a document directly from the stored bit mapped image of the document, without decoding the words, such as by converting the words in the document image to character code representations, such as ASCII or other coded text. The technique, therefore, is essentially language independent, and, in fact, graphic patterns, coded and nonsense words, can easily be included and processed, and the possible introduction of unnecessary errors due to intermediate interpretation processes such as optical character recognition (OCR) can be eliminated. The method also can take advantage of the naturally segmentable nature of the word unit images used throughout printed text.

The equivalence classes preferably are determined by comparing selected morphological image characteristics or combinations of characteristics, or the derived representations of the image unit shapes, with each other. The morphological image characteristics can include image unit length, width, font, typeface, cross-sectional characteristics, number of ascenders, number of descenders, or the like. The image units in each equivalence class are linked together, and mapped to enable the frequency of each to be determined.

In accordance with another aspect of the invention, a method for performing data driven processing in a data processing system which comprises execution processing means for performing functions by executing program instructions in a predetermined manner and memory means containing a plurality of processing program modules is presented. The method includes identifying word units in the text images, and determining at least one morphological image characteristic of the word units. The word units with similar morphological image characteristics are then clustered, and the clustered word units are quantified.

In accordance with still another aspect of the invention, an apparatus for processing a digital image of text on a document to determine word frequency in the text is presented. The apparatus includes word frequency determining means for computing frequencies of word units by utilizing non-content based word unit morphological image characteristics, and an output device. The word frequency determining means can be a programmed digital computer.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

The invention is illustrated in the accompanying drawings, in which.

DETAILED DESCRIPTION OF THE PREFERRED EMBODIMENT

Figure 1:
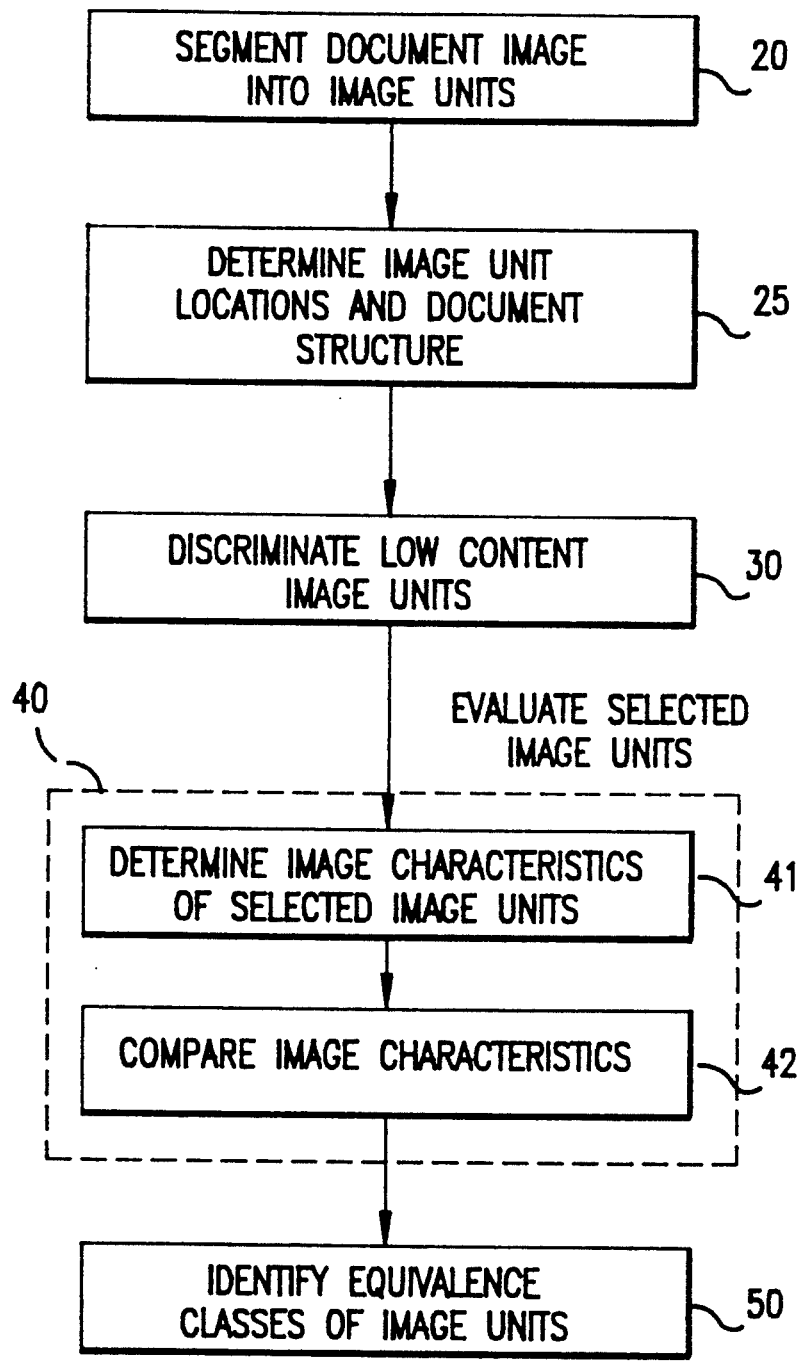
FIG. 1 shows a flow chart of a method according to a preferred embodiment of the invention for determining image unit or word frequencies in a document without first converting the document to character codes.
Figure 2:
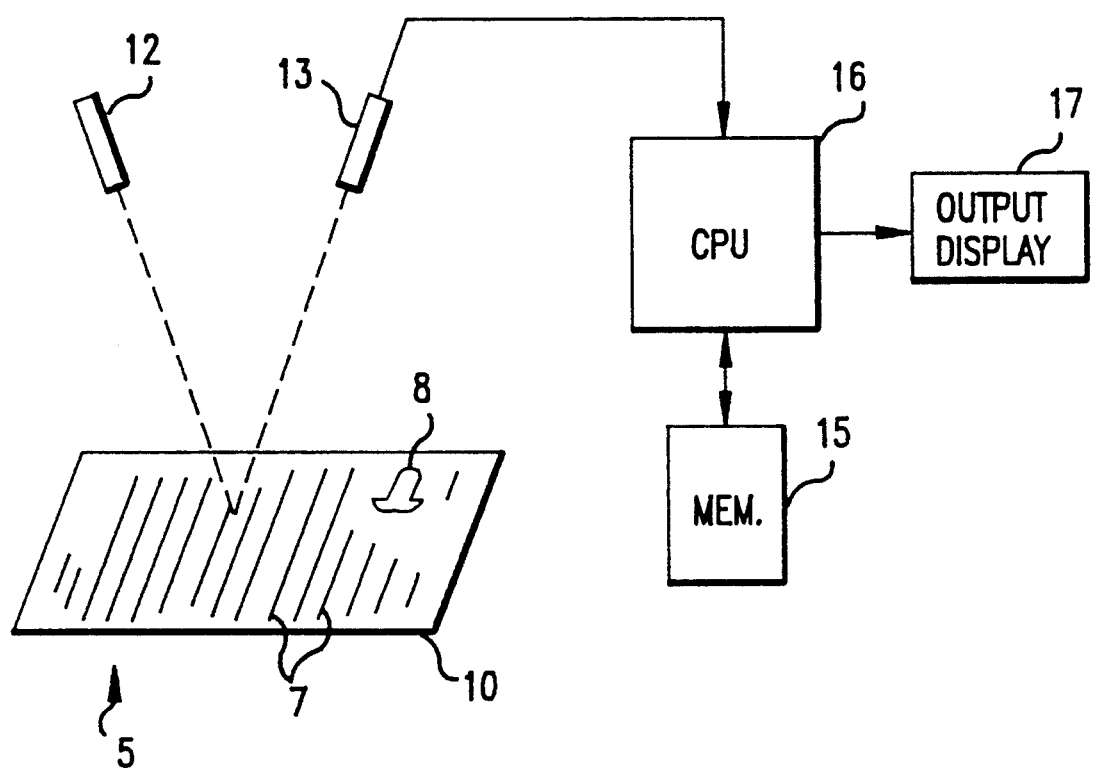
FIG. 2 shows an apparatus according to a preferred embodiment of the invention for determining image unit or word frequencies in a document without first decoding the image units or words or converting the image units or words in the document to character codes.

A preferred embodiment of the method of the invention is illustrated in the flow chart of FIG. 1, and apparatus for performing the method of FIG. 1 is shown in FIG. 2. For the sake of clarity, the invention will be described with reference to the processing of a single document. However, it will be appreciated that the invention is applicable to the processing of a corpus of documents containing a plurality of documents.

With reference first to FIG. 2, the method is performed on an electronic image of an original document 5, which may include lines of text 7, titles, drawings, FIGS. 8, or the like, contained in one or more sheets or pages of paper 10 or other tangible form. The electronic document image to be processed is created in any conventional manner, for example, by input means, such as an optical scanner 12 and sensor 13 as shown, a copier machine scanner, a Braille reading machine scanner, a bitmap workstation, an electronic beam scanner or the like. Such input means are well known in the art, and thus are not described in detail herein. An output derived from, for example, a scanner sensor 13 is digitized to produce bit mapped image data representing the document image for each page of the document, which data is stored, for example, in a memory 15 of a special or general purpose digital computer 16. The digital computer 16 can be of the type that performs data driven processing in a data processing system which comprises execution processing means for performing functions by executing program instructions in a predetermined manner, such computers now being well known in the art. The output from the computer 16 is delivered to an output device, such as, for example, a memory or other form of storage unit, or an output display 17 as illustrated, which may be, for instance, a photocopier, CRT display, printer, facsimile machine, or the like.

With reference now to FIG. 1, the first phase of the image processing technique of the invention involves a low level document image analysis in which the document image for each page is segmented into undecoded information containing image units (step 20) using conventional image analysis techniques; or, in the case of text documents, using the bounding box method described in copending U.S. patent application No. 07/794,392 filed concurrently herewith by Huttenlocher and Hopcroft, and entitled "Method for Determining Boundaries of Words in Text".

Another method for finding word boxes is to close the image with a horizontal SE (structuring element) that joins characters but not words, followed by an operation that labels the bounding boxes of the connected image components (which in this case are words). The process can be greatly accelerated by using 1 or more threshold reductions (with threshold value 1), that have the effect both of reducing the image and of closing the spacing between the characters. The threshold reduction(s) are typically followed by a closing with a small horizontal SE. The connected component labeling operation is also done at the reduced scale, and the results are scaled up to full size. The disadvantage of operating at reduced scale is that the word bounding boxes are only approximate; however, for many applications the accuracy is sufficient. The described method works fairly well for arbitrary text fonts, but in extreme cases, such as large fixed width fonts that have large inter-character separation or small variable width fonts that have small inter-word separation, mistakes can occur. The most robust method chooses a SE for closing based on a measurement of specific image characteristics. This requires adding the following two steps:

(1) Order the image components in the original or reduced (but not closed) image in line order, left to right and top to bottom.

(2) Build a histogram of the horizontal intercomponent spacing. This histogram should naturally divide into the small inter-character spacing and the larger inter-word spacings. Then use the valley between these peaks to determine the size of SE to use for closing the image to merge characters but not join words.

After the bounding boxes or word boxes have been determined, locations of and spatial relationships between the image units on a page are determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a single unit of understanding. Such single units of understanding are generally characterized in an image as being separated by a spacing greater than that which separates the elements forming a unit, or by some predetermined graphical emphasis, such as, for example, a surrounding box image or other graphical separator, which distinguishes one or more image units from other image units in the document image. Such image units representing single units of understanding will be referred to hereinafter as "word units."

Advantageously, a discrimination step 30 is next performed to identify the image units which have insufficient information content to be useful in evaluating the subject matter content of the document being processed. One preferred method is to use the morphological function or stop word detection techniques disclosed in the copending U.S. patent application No. 07/794,190 filed concurrently herewith by D. Bloomberg et al., and entitled "Detecting Function Words Without Converting A Scanned Document to Character Codes".

Next, in step 40, selected image units, e.g., the image units not discriminated in step 30, are evaluated, without decoding the image units being classified or reference to decoded image data, based on an evaluation of predetermined image characteristics of the image units. The evaluation entails a determination (step 41) of the image characteristics and a comparison (step 42) of the determined image characteristics for each image unit with the determined image characteristics of the other image units.

One preferred method for defining the image unit morphological image characteristics to be evaluated is to use the word shape derivation techniques disclosed in copending U.S. patent application No. 07/794,391 filed concurrently herewith by D. Huttenlocher and M. Hopcroft, and entitled "A Method for Deriving Wordshapes for Subsequent Comparison." As described in the aforesaid application, at least one, one-dimensional signal characterizing the shape of a word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit.

The determined image characteristic(s) e.g., the derived image unit shape representations of each selected image unit are compared, as noted above (step 41), with the determined image characteristic(s)/derived image unit shape representations of the other selected image units for the purpose of identifying equivalence classes of image units (step 50), such that each equivalence class contains most or all of the instances of a given word in the document. The equivalence classes are thus formed by clustering the image units in the document based on the similarity of image unit classifiers, without actually decoding the contents of the image units, such as by conversion of the word images to character codes or other higher-level interpretation. Any of a number of different methods of comparison can be used. One technique that can be used, for example, is by correlating the raster images of the extracted image units using decision networks, such technique being described for characters in a Research Report entitled "Unsupervised Construction of Decision networks for Pattern Classification" by Casey et al., IBM Research Report, 1984, herein incorporated in its entirety.

Preferred techniques that can be used to identify equivalence classes of word units are the word shape comparison techniques disclosed in U.S. patent application Nos. 07/796,119 and 07/795,169, filed concurrently herewith by Huttenlocher and Hopcroft, and by Huttenlocher, Hopcroft and Wayner, respectively, and entitled, respectively, "Optical Word Recognition By Examination of Word Shape," and "Method for Comparing Word Shapes".

Depending on the particular application, and the relative importance of processing speed versus accuracy, for example, comparisons of different degrees of precision can be performed. For example, useful comparisons can be based on length, width or some other measurement dimension of the image unit (or derived image unit shape representation e.g., the largest figure in a document image); the location of the image unit in the document (including any selected figure or paragraph of a document image, e.g., headings, initial figures, one or more paragraphs or figures), font, typeface, cross-section (a cross-section being a sequence of pixels of similar state in an image unit); the number of ascenders; the number of descenders; the average pixel density; the length of a top line contour, including peaks and troughs; the length of a base contour, including peaks and troughs; and combinations of such classifiers.

In instances in which multiple page documents are processed, each page is processed and the data held in the memory 15 (see FIG. 2), as described above. The entirety of the data can then be processed.

One way in which the image units can be conveniently compared and classified into equivalence classes is by comparing each image unit or image unit shape representation when it is formed with previously processed image units/shape representations, and if a match is obtained, the associated image unit is identified with the matching equivalence class. This can be done, for example, by providing a signal indicating a match and incrementing a counter or a register associated with the matching equivalence class. If the present image unit does not match with any previously processed image unit, then a new equivalence class is created for the present image unit.

Alternatively, as shown (step 50) the image units in each equivalence class can be linked together, and mapped to an equivalence class label that is determined for each equivalence class. The number of entries for each equivalence class can then be merely counted.

Thus, after the entire document image, or a portion of interest, has been processed, a number of equivalence classes will have been identified, each having an associated number indicting the number of times a image unit was identified having similar morphological characteristics, or classifiers, thus determining the image unit frequency.

A salient feature provided by the technique of the invention is the processing, identification, comparison, or manipulation of image units without an accompanying requirement that the content of the image units be decoded, even for output. More particularly, image units are determined, processed and delivered for output without decoding, so that in essence, the actual content of the image units is never required to be determined. Thus, for example, in such applications as copier machines or electronic printers that can print or reproduce images directly from one document to another without regard to ASCII or other encoding/decoding requirements, image units can be identified, and processed using one or more morphological characteristic or property of the image unit. In the comparison process described, for instance, each image unit, of undetermined content, in the area of the document image of interest is compared with other image units in the document also of undetermined content. Selected image units, still of undetermined content, can then be optically or electronically delivered for output, for example, to an image reproducing apparatus of a copier machine, an electronic memory, a visual display, or the like, for example in producing a list of significant "words", or image units in order of frequency of appearance in the document image.

The technique described above can be used to determine the significance of the image units of a document, based upon the criterion of frequency of occurrence of a particular image unit. Thus, for example, the number of times an image unit appears in its respective equivalence class can be used to construct a hierarchy of words, such hierarchy being useful for many purposes, such as for example, generating document summaries and annotations. It is noted, however, that the classifiers are determined without actually decoding the content of the image unit; only the selected classifiers of the image unit itself are used. The method can be applied, of course, to documents of multiple page length in a similar manner to that described above.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for determining a frequency of occurrence of word units in an electronic document image having words represented as an undecoded content, comprising the steps of:
    segmenting the document image into word units without decoding the document image content, each word unit corresponding to a word in said document image;
    deriving a word shape representation of selected word units in the document image without detecting or identifying any characters making up the word corresponding to the selected word units;
    identifying equivalence classes of the selected word units in the document image by clustering the ones of the selected word units having similar word shape representations; and
    quantifying the word units in each equivalence class.

2. The method of claim 1 wherein said step of identifying equivalence classes of word units comprises correlating said word shape representations of said word units using a decision network.

3. The method of claim 1 wherein said step of identifying equivalence classes comprises comparing word shape representations of said word units.

4. The method of claim 3 wherein said word shape representations are derived by deriving at least one, one-dimensional signal characterizing the shape of each word unit.

5. The method of claim 3 wherein said word shape representations are derived by deriving an image function defining a boundary enclosing the word unit, and augmenting the image function so that an edge function representing edges of a character string detected within the boundary is defined over its entire domain by a single independent variable within the closed boundary, without individually detecting and/or identifying the character or characters making up the word unit.

6. The method of claim 1 wherein said step of quantifying the word units in each equivalence class comprises linking word units together.

7. The method of claim 6 wherein said step of linking word units together comprises determining an equivalence class label for each word unit, and mapping each word unit tot he determined equivalence class label.

8. The method of claim 1, further comprising the step of optically scanning a document to form said document image prior to segmenting the document image.

9. The method of claim 1 wherein said steps of segmenting the document image into word units, deriving a word shape representation of the word units, identifying equivalence classes of the word units, clustering the word units, and quantifying the word units are performed by operating a programmed digital computer.

10. The method of claim 1, further comprising producing an output based on the identified equivalence classes.

11. The method of claim 10, wherein said output is also produced based on the quantification of each equivalence class.

12. The method of claim 11, wherein said output is a list of the words, represented by the word units, in order of frequency of appearance of said words in said document image.

13. In a method for electronically processing an electronic document comprising text images, the steps of:
   identifying word units in said text images without decoding the text images, each word unit corresponding to a word in said document image;
   deriving a word shape representation of said word units without detecting or identifying any characters making up the words corresponding to the word units;
   clustering word units having similar word shape representations into equivalence classes; and
   quantifying the number of word units in each equivalence class.

14. The method of claim 13, further comprising:
   outputting a list of the words, represented by the word units, in order of frequency of appearance of said words in said electronic document based on said clustering and quantifying steps.

15. An apparatus for processing a digital image of text on a document to determine word frequency in the text, comprising:
   means for segmenting the digital image into word units without decoding the digital image of text, each word unit corresponding to a word in said digital image;
   means for deriving a word shape representation of selected ones of said word units without detecting or identifying any characters making up the words corresponding to the selected word units;
   means for comparing the word shape representations of each of said selected word units to identify equivalent word units; and
   an output device for producing an output responsive to the relative frequencies of occurrence of the selected word units identified as being equivalent.

16. The apparatus of claim 15 wherein said word shape representation deriving means comprises means for deriving at least one, one-dimensional signal characterizing a shape of said word units.

17. The apparatus of claim 15 wherein said word shape representation deriving means comprises means for deriving an image function defining a boundary enclosing each word unit, and augmenting the image function so that an edge function representing edges of a character string detected within the boundary is defined over its entire domain by a single independent variable within the closed boundary, without individually detecting and/or identifying the character or characters making up the word units.

18. The apparatus of claim 15, wherein said output device outputs a list of the words represented by said word units in order of frequency of appearance of said words in said text.

19. A method for determining a frequency of occurrence of word units in an electronic document image having words represented as an undecoded content, comprising the steps of:
   segmenting the document image into word units without decoding the document image content, each word unit corresponding to a word in said document image;
   determining at least one significant morphological image characteristic of selected word units in the document image without detecting or identifying any characters making up the word corresponding to the selected word units;
   identifying equivalence classes of the selected word units in the document image by clustering the ones of the selected word units having similar morphological image characteristics; and
   quantifying the word units in each equivalence class.

20. The method according to claim 19, wherein said step of determining at least one significant morphological characteristic of said word units includes determining at least one of a dimension, font, typeface, number of ascender elements, number of descender elements, pixel density, pixel cross-sectional characteristic and contour characteristic of said selected word units.

* * * * *

UNITED STATES PATENT AND TRADEMARK OFFICE
CERTIFICATE OF CORRECTION

PATENT NO. : 5,325,444

DATED : June 28, 1994

INVENTOR(S) : Todd A. CASS, Pre-Kristian HALVORSEN, Daniel P. HUTTENLOCHER, Ronald M. KAPLAN, M. Margaret WITHGOTT and Ramona B. RAO It is certified that error appears in the above-indentified patent and that said Letters Patent is hereby corrected as shown below:

Title page, Item No. [75], please add --Ramona B. RAO, San Francisco, CA--.

Signed and Sealed this

Twentieth Day of September, 1994

Attest:

BRUCE LEHMAN

Attesting Officer     Commissioner of Patents and Trademarks